US009996603B2

(12) United States Patent
Khattar (10) Patent No.: US 9,996,603 B2
(45) Date of Patent: Jun. 12, 2018

(54) DETECTING HOMOLOGIES IN ENCRYPTED AND UNENCRYPTED DOCUMENTS USING FUZZY HASHING

(71) Applicant: Adobe Systems Incorporated, San Jose, CA (US)

(72) Inventor: Kapil Khattar, New Delhi (IN)

(73) Assignee: Adobe Systems Inc., San Jose, CA (US)

( * ) Notice: Subject to any disclaimer, the term of this patent is extended or adjusted under 35 U.S.C. 154(b) by 246 days.

(21) Appl. No.: 14/514,046

(22) Filed: Oct. 14, 2014

(65) Prior Publication Data
US 2016/0103831 A1    Apr. 14, 2016

(51) Int. Cl.
*G06F 17/00* (2006.01)
*G06F 17/30* (2006.01)

(52) U.S. Cl.
CPC .. *G06F 17/30598* (2013.01); *G06F 17/30705* (2013.01)

(58) Field of Classification Search
CPC .............. G06F 17/30; G06F 17/30598; G06F 17/30705; G06F 17/2229; G06F 17/2211
USPC ........................................................ 715/210
See application file for complete search history.

(56) References Cited

U.S. PATENT DOCUMENTS

| | | | | |
|---|---|---|---|---|
| 6,658,626 B1* | 12/2003 | Aiken | ................ | G06F 17/2211 707/E17.039 |
| 7,222,299 B1* | 5/2007 | Lim | ..................... | G06F 17/218 715/273 |
| 8,635,700 B2* | 1/2014 | Richard | ................ | G06F 21/562 370/474 |
| 9,098,513 B1* | 8/2015 | Ren | .................... | G06F 17/30067 |
| 2009/0195796 A1* | 8/2009 | Monga | ............... | G06K 9/00442 358/1.9 |
| 2009/0307251 A1* | 12/2009 | Heller | ................. | G06F 17/3015 |
| 2010/0017487 A1* | 1/2010 | Patinkin | .............. | G06Q 10/107 709/206 |
| 2010/0049708 A1* | 2/2010 | Kawai | ............... | G06F 17/30705 707/748 |
| 2011/0087668 A1* | 4/2011 | Thomas | ............ | G06F 17/30705 707/738 |
| 2013/0073528 A1* | 3/2013 | Aronovich | ............... | G06F 7/00 707/692 |

(Continued)

*Primary Examiner* — Scott Baderman
*Assistant Examiner* — Jason Edwards
(74) *Attorney, Agent, or Firm* — Finch & Maloney PLLC (57) ABSTRACT

Techniques are provided for automatically detecting homologies between documents based on structural characteristics. Various statistics relating to the COS structure of a PDF document are compiled. The statistics are input into a rolling hash function to generate a digital fingerprint of the document. Fingerprints from two similar documents will have small edit distances between them, and can therefore be classified similarly or provided as results to a fingerprint-based search. For example, an unclassified document may be classified in the same class as a representative document where the fingerprints of the two documents have a small edit distance between them. Since the structure of the document is used instead of the text content or renderings, it is possible to operate on encrypted documents. Further, representative elements of a particular class of documents can be selected for comparison against a target document for improved resolution of the results.

20 Claims, 7 Drawing Sheets

(56) References Cited

U.S. PATENT DOCUMENTS

| | | | |
|---|---|---|---|
| 2013/0232160 A1* | 9/2013 | Tibble | G06F 17/2211 707/758 |
| 2013/0279740 A1* | 10/2013 | Bauer | G06T 1/0021 382/100 |
| 2014/0032513 A1* | 1/2014 | Gaither | G06F 17/2211 707/698 |
| 2014/0122495 A1* | 5/2014 | Kawai | G06F 17/30705 707/738 |
| 2014/0279956 A1* | 9/2014 | Trimble | G06F 3/0641 707/692 |
| 2015/0019499 A1* | 1/2015 | Aronovich | G06F 17/30097 707/692 |
| 2015/0096023 A1* | 4/2015 | Mesdaq | H04L 63/145 726/23 |
| 2016/0034273 A1* | 2/2016 | Leupold | G06F 8/71 717/122 |

* cited by examiner

DETECTING HOMOLOGIES IN ENCRYPTED AND UNENCRYPTED DOCUMENTS USING FUZZY HASHING

FIELD OF THE DISCLOSURE

This disclosure relates to the field of data processing, and more particularly, to techniques for automatically detecting homologies between documents based on the structural characteristics of the documents.

BACKGROUND

Automatic document searching and classification are processes of algorithmically comparing documents to a search query and assigning documents to one or more classes, respectively. For example, documents may be searched or classified according to their content or other attributes, such as author, date, and subject. Some existing solutions search and classify documents based on document or text clustering. Text clustering uses descriptors, or sets of words, to group similar documents together. Other existing solutions render the documents in memory and attempt to isolate artifacts from the rendering. Artifacts from two documents can then be compared to identify any similarities. Given the increasing complexity and volume of electronically stored information, there is a need for improved search and classification techniques that overcome limitations of existing schemes.

BRIEF DESCRIPTION OF THE DRAWINGS

The accompanying drawings are not intended to be drawn to scale. In the drawings, each identical or nearly identical component that is illustrated in various figures is represented by a like numeral.

FIG. 2A shows an example of a representative document, in accordance with an embodiment.

FIG. 2B shows an example of an unclassified document, in accordance with an embodiment of the present invention.

DETAILED DESCRIPTION

Existing document search and classification techniques that use text extraction and rendering have several limitations. One limitation is that neither text extraction nor rendering can be performed on encrypted documents. Another limitation is that, with the rendering approach, documents must be compared at run time. Comparing n documents requires n*(n−1)/2 renderings, which is computationally expensive for large numbers of documents.

To this end, and in accordance with various embodiments of the present invention, techniques are provided for automatically detecting homologies between documents based on structural characteristics using fuzzy hashing. Encrypted and unencrypted documents that are structurally similar, or homologous, to representative documents can be classified together. Further, the structure or structures of one or more documents can form the basis of a search for other documents with similar structures. Portable Document Format (PDF) is a standardized format that can be used to present documents with text, images, multimedia elements, web page links, and other forms of information. A PDF document is encoded with a COS ("Carousel" Object Structure) object tree. The objects in the tree and the relationships between these objects form the structure of the PDF document and represent the content and appearance of the document.

According to an embodiment of the present invention, various statistics relating to the COS structure of a PDF document are compiled, such as the number of comments in the document, the number of cross-referenced objects in the document, the number of fonts and font descriptors in the document, and information about the content of the document, among others. The statistics are input into a rolling hash function to generate a so-called digital fingerprint of the document. The rolling hash operates piecewise on multiple consecutive segments of input data, such that changes in the output of the hash function are linear with respect to changes in the input. This is also referred to as fuzzy hashing. As such, two or more documents that have similar COS object trees result in digital fingerprints that have small edit distances between them. An edit distance refers to a quantification of how dissimilar two fingerprints are to one another by counting the minimum number of changes required to transform one fingerprint into the other. Fingerprints from two similar documents will have small edit distances between them, and can therefore be classified similarly or provided as results to a fingerprint-based search. For example, an unclassified document may be classified in the same class as a representative document where the fingerprints of the two documents have a small edit distance between them. Since the structure of the document is used instead of the text content or renderings, it is possible to operate on encrypted documents. Further, representative elements of a particular class of documents can be selected for comparison against a target document for improved resolution of the results. In other words, the comparison and classifying can be done at the element level as well as the document level. Numerous configurations and variations will be apparent in light of this disclosure.

Figure 1:
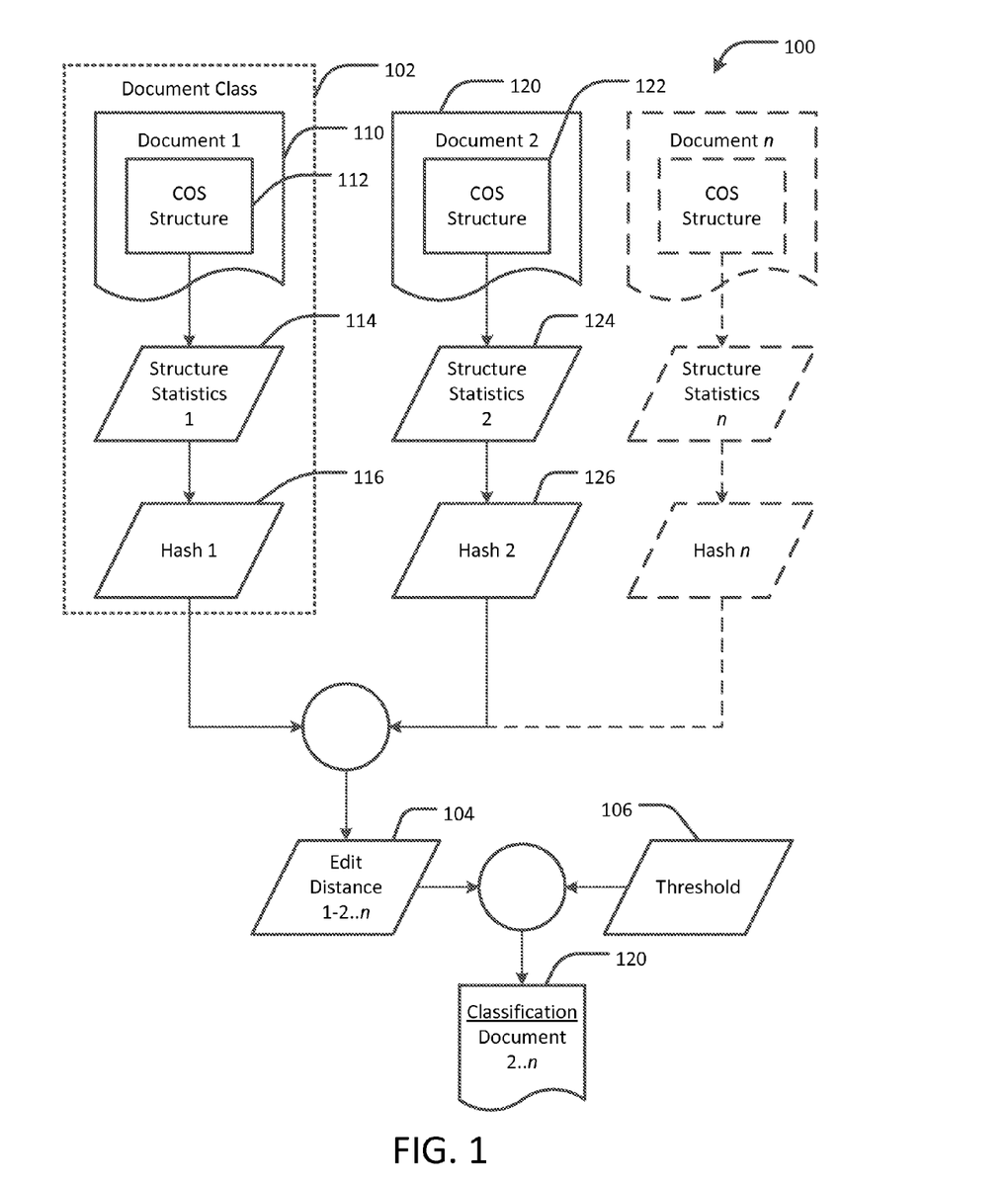
FIG. 1 illustrates an example data flow diagram for automatically detecting homologies between documents based on structural characteristics, in accordance with an embodiment of the present invention.

FIG. 1 illustrates an example data flow diagram 100 for automatically detecting homologies between documents based on structural characteristics, in accordance with an embodiment. At least one document 110 is designated as a representative of a class 102 of documents. The document 110 can reside in a document cloud such as Google Drive or Adobe BlueHeron Document Store. The representative document 110 may, in one example, include a banking form. In this example, a banking representative or other document user may manually classify the form as a direct debit authorization form using a user interface that enables the user to manually select the classification (e.g., the document 110 is designated as a representative of the class 102). The class 102 can include any number of representative documents. The representative document(s) 110 can be stored in a document repository on the document cloud and used as a basis for classifying similar documents that reside in the document cloud or elsewhere. The representative document 110 includes a COS object tree 112, which is also referred to in this disclosure as a COS structure. The COS structure 112 includes objects and file structures that form the representative document 110. COS objects can represent document components, such as bookmarks, pages, fonts, comments and annotations. The COS structure 112 can include several types of object data, including arrays, dictionaries, numbers, Boolean values, names, strings, streams, and a null object. Statistics 114 about the COS structure 112 are compiled by parsing the representative document 110. Examples of the structure statistics 114 include the number of comments, the number of entries in the cross-reference table and trailer, the number of indirect objects, and objects in PDF dictionaries and the object identifiers of the referred objects. The cross reference table contains references to all the objects in the document, and each object in the document is represented by one entry in the table. The trailer specifies how an application reading the document should find the cross reference table and other special objects in the document. In some cases, the reference document 110 contains incremental updates. Each incremental update is represented in the COS structure 112 by an additional header, body, cross reference table, or trailer.

FIG. 2A shows an example of a representative document 150, in accordance with an embodiment. The example representative document 150 is a PDF document that includes text, fields for entering information, and graphics, such as boxes and solid and dashed lines. Although not visible, the example representative document 150 includes various objects that form the structure of the document and are used to represent the visible elements of the document, such as the fonts. One example of the structure statistics 114 that may be compiled by parsing the representative document 110 is as follows:

```
Comment: 5
XREF: 3
Trailer: 3
StartXref: 3
Indirect object: 90
    27: 122, 162, 128, 129, 130, 131, 132, 136, 137, 138, 142, 144, 145,
147, 149, 151, 152, 154, 155, 157, 158, 160, 5, 5, 164, 184, 185
/Annot 20: 163, 165, 166, 167, 168, 169, 170, 171, 172, 173, 174, 175,
176, 177, 178, 179, 180, 181, 182, 183
/Catalog 2: 123, 123
/Encoding 3: 141, 148, 202
/ExtGState 2: 139, 140
/Font 8: 125, 126, 127, 133, 134, 135, 200, 201
/FontDescriptor 6: 143, 146, 150, 153, 156, 159
/Metadata 2: 4, 4
/ObjStm 2: 1, 2
/Page 2: 124, 124
/Pages 1: 3
/XObject 14: 186, 187, 188, 189, 190, 191, 192, 193, 194, 195, 196, 197,
198, 199
/XRef 1: 161
```

The structure statistics 114 describe various objects and other elements in the representative document 150. For example, "Comment" refers to the number of comments, "XREF" refers to the number of cross-reference dictionaries, "Trailer" refers to the number of trailer dictionaries, and "Font" refers to the number of font dictionary indirect objects and the object identification numbers of those indirect objects. Other entries in the example structure statistics 114 refer to different types of dictionaries defined by the /Type entry in a PDF dictionary of the representative document 114. It will be understood that other types of dictionaries or data can define the structure of the representative document 114, and that the above examples are intended to be non-limiting.

The structure statistics 114 are input into a hash algorithm to produce a digital fingerprint, or hash 116, of the reference document 110. The hash algorithm may, for example, include any regular hash algorithm, such as a rolling hash (e.g., SSDeep), a hash having a fixed size window on the input, or a hash that is triggered on a new line character in the structure statistics 114. The hash 116 is associated with the class of documents 102 as metadata. If there is more than one representative document 110, then the hash for each document is associated with the class 102. An example of the hash 116 metadata for a class of documents 102 is:

```
3072:aEtSgNfkdTDB7gcKv192JPddW5013C+ySOPhG4VJWAy4aTPtabdTMZT+nkQB
JuB39:BtwNF0fBE9N9QIN3uDPHgz5TPeeg7eBL
```

If the representative document 114 is a member of more than one class 102, the process of parsing the document structure 112, compiling the statistics 114, and generating the hash 116 are repeated for each class.

Referring to FIG. 1, there can be one or more unclassified documents 120 in addition to the representative document 110. The unclassified document 120 can be classified by parsing the COS structure 122 of the document 120, compiling structure statistics 124 from the COS structure 122, and generating a hash 126 in the same manner as described with respect to the representative document 110. The hash 126 for the unclassified document 120 is then compared against the hash 116 for the representative document(s) 110 of each class 102 to produce an edit distance 104 between the hashes 116 and 126. If the edit distance is lower than a threshold 106, the unclassified document 120 is classified as a member of the same class 102 as the representative document 110. The unclassified document 120 can be compared to other representative documents 110 in different classes 102 in a similar manner and classified accordingly where the respective edit distance 104 is lower than a corresponding threshold 106 for the class 102.

FIG. 2B shows an example of an unclassified document 152, in accordance with an embodiment. The example unclassified document 152 is similar to the representative document 150 of FIG. 2A, except that it has been modified by a document user. The modifications include user entries in the fields of the document 152. As with the representative document 150, the example representative document 150 includes various invisible objects that form the structure of the document and are used to represent the visible elements of the document. Since the unclassified document 152 has a structure similar, if not identical, to the representative document 150, the structural statistics 124 of the unclassified document 122 will be the same or substantially similar to the structural statistics 114 of the representative document 110. Therefore, the edit distance between the hashes of the structural statistics 114 and 124 will be small (e.g., less than a threshold amount), indicating the similarity of the unclassified document 152 to the representative document 150. Such similarity can be used to classify the unclassified document 152 in the same class as the classified, representative document 150.

Referring again to FIG. 1, in an embodiment, multiple representative documents 110 (e.g., two, three, four, five or six documents) are considered representative of the class 102. In the case where none of the representative documents 110 are pre-classified, the threshold 106 for the class 102 is an initial, pre-defined value (e.g., a reasonable static value which may depend on the fuzzy hash algorithm used), which is used to bootstrap the classification process. As additional representative documents 110 are classified, the threshold 106 for the class 102 is dynamically recalculated based on the edit distance of the hash from the mean of the representative hash values obtained from previously classified documents. As described above, the edit distance refers to a quantification of how dissimilar two hashes are to one another by counting the minimum number of changes required to transform one hash into the other. The edit distance between two hashes can be determined using various techniques, for example, Levenshtein distance, Hamming distance, longest common subsequence (LCS) distance, Jaro-Winkler distance, or any other suitable technique for determining the edit distance. The threshold 106 can be dynamically recalculated by averaging the current threshold value with the edit distance between a newly classified representative document 110 and any one or more of the previously classified representative documents 110. In effect, threshold 106 for the class 102 is the maximum of all the edit distances of all the documents in the class 102 from the representative (e.g., mean) hash for the class 102. The representative hash can be chosen such that the standard deviation of edit distances for all documents assigned so far to the class is minimized. The threshold 106 is an indication of the span of the class 102 and the representative document 110 can be considered to be the kernel or center of the class 102. In the case where more than one representative document 110 is pre-classified, the threshold 106 is based on the edit distance from the mean representative hash value obtained from the pre-classified documents, as described above. Since the maximum variance determines the threshold 106 of the class 102, different classes may have different thresholds. In some embodiments, the threshold 106 is adjusted as unclassified documents 120 are classified in the same class 102 by taking the maximum variance to the mean edit distance between all documents 102 belonging to the class 102.

In some embodiments, the classification techniques disclosed herein can be used to search for similar documents. For example, the search query may include a digital fingerprint of the document. A search for other documents having similar fingerprints can be conducted, the results of which may include documents from a class whose edit distance is the lowest to the fingerprint of the source document.

Example Methodology

Figure 3:
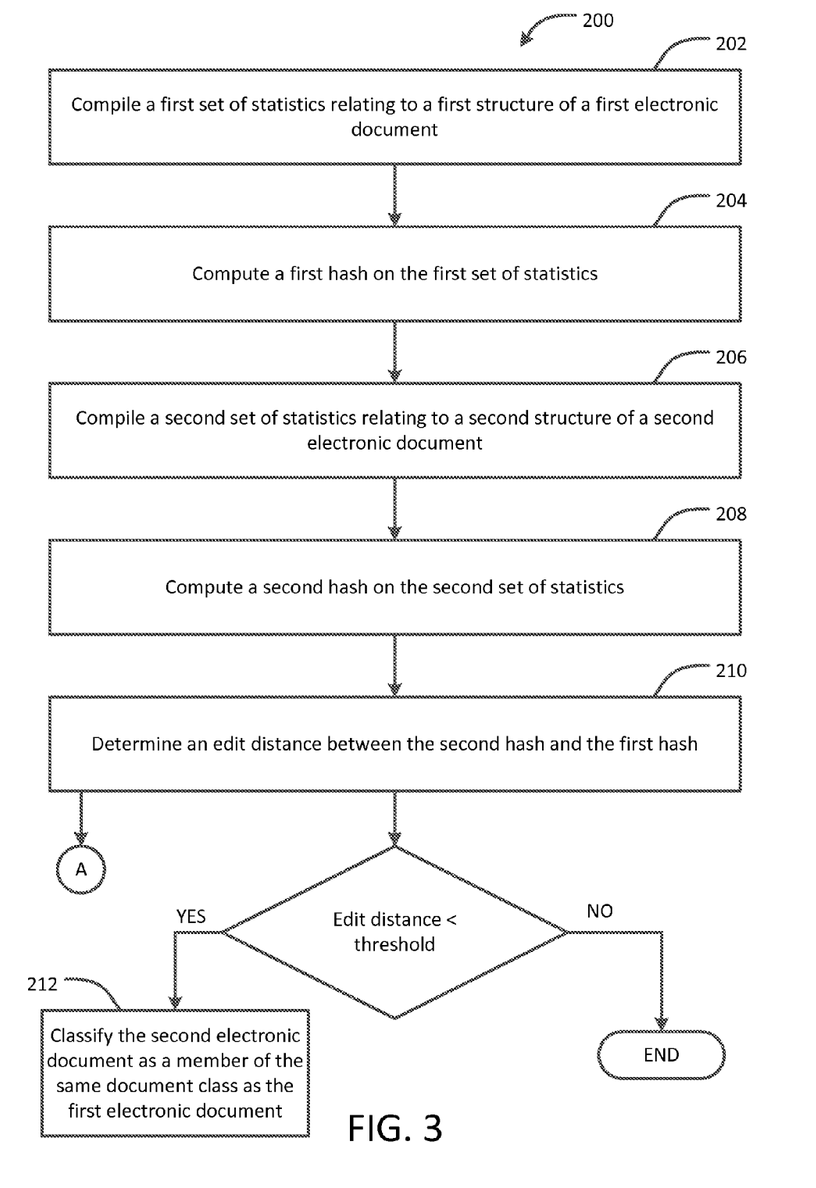
FIGS. 3, 4 and 5 are flow diagrams of example methodologies for automatically detecting homologies between documents based on structural characteristics, in accordance with several embodiments of the present invention.
Figure 4:
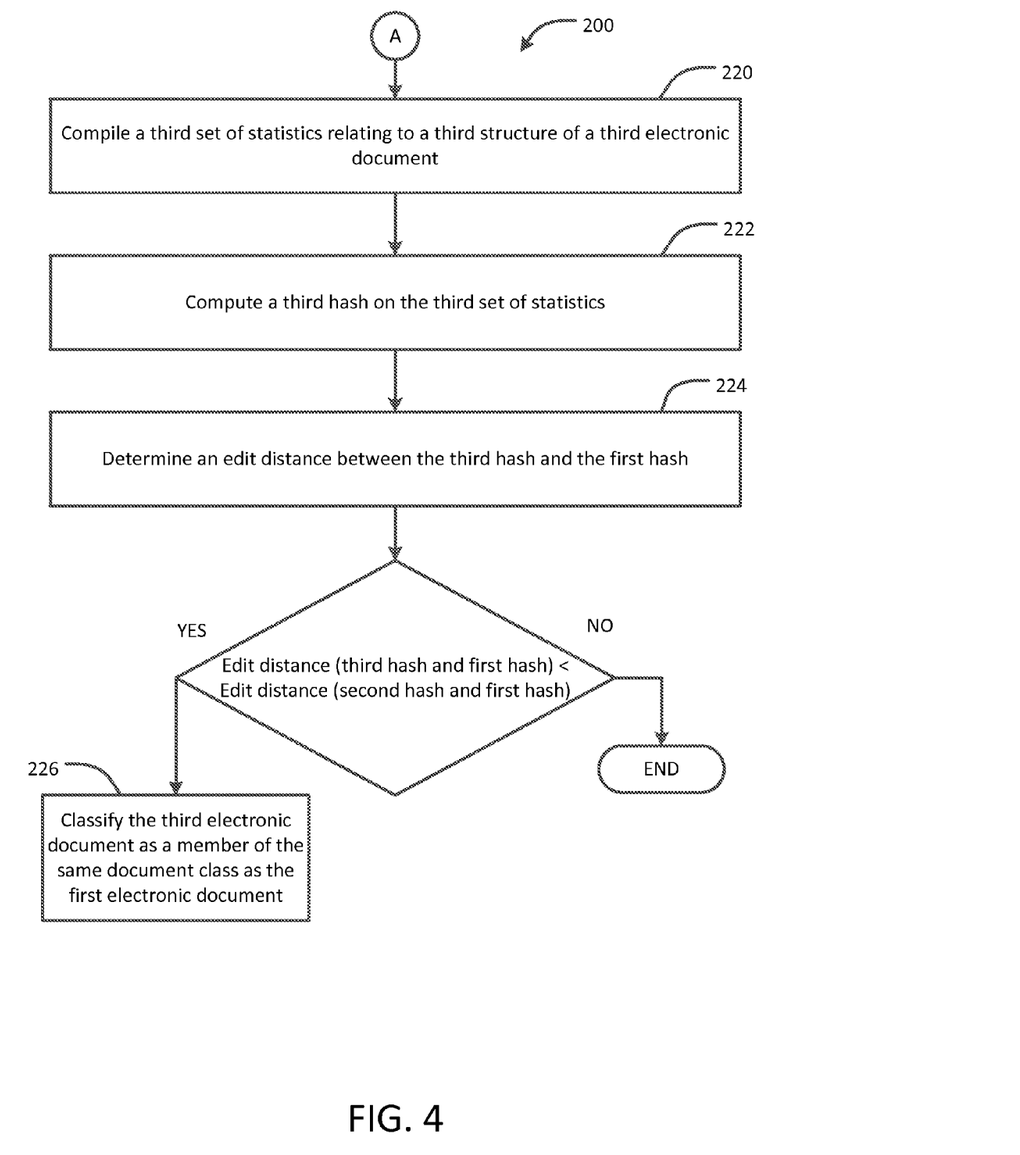
Figure 5:
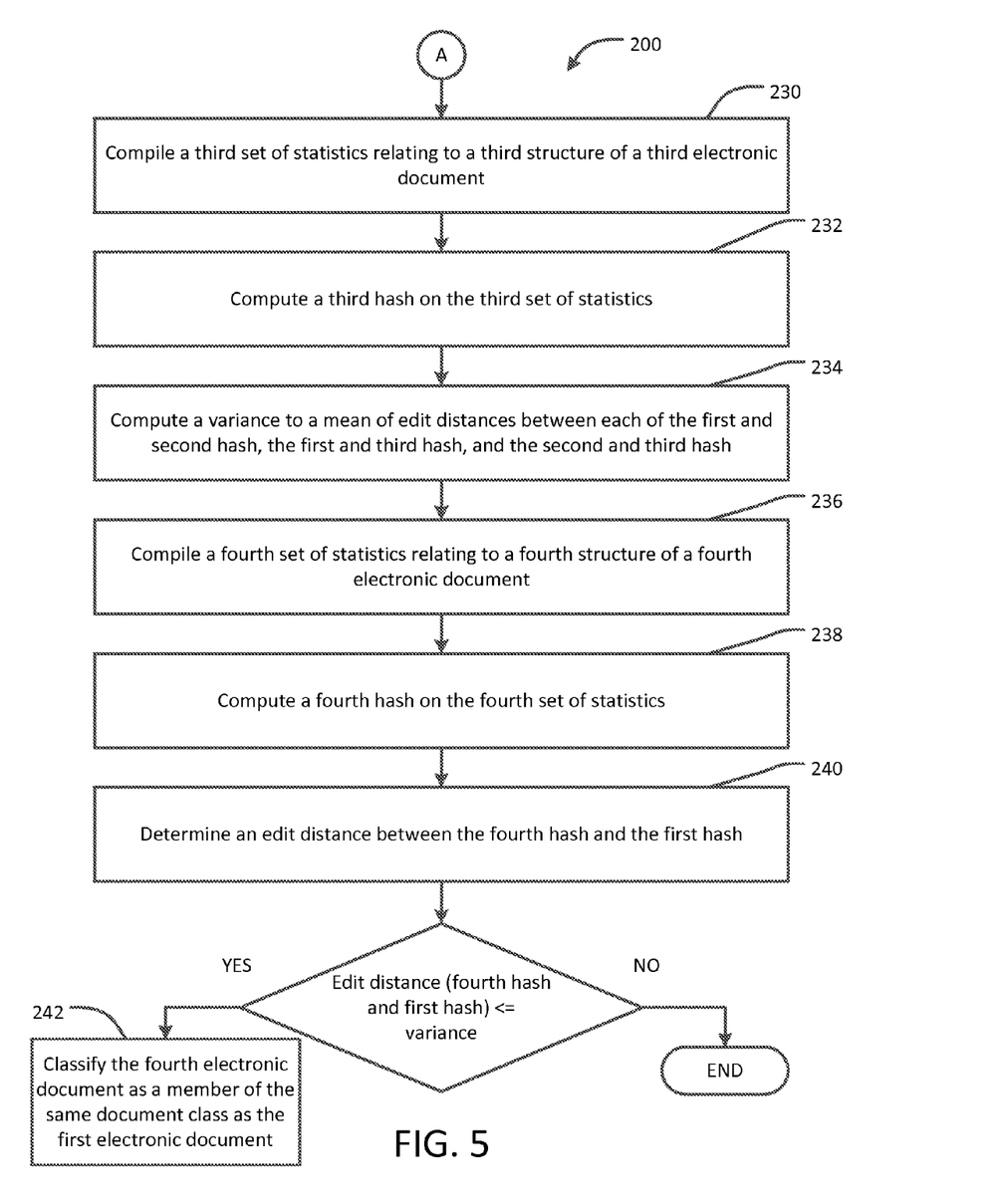

FIGS. 3, 4 and 5 are flow diagrams of example methodologies 200 for automatically detecting homologies between documents based on structural characteristics, in accordance with several embodiments. Referring first to FIG. 3, in one embodiment, the method 200 begins by compiling 202 a first set of statistics relating to a first structure of a first electronic document. In some cases, the first set of statistics includes a number of comments in the first structure, a number of object references in the first structure, a number of trailers in the first structure, a number of indirect objects in the first structure, object identification values in the first structure, or any combination of these. The method 200 continues by computing 204 a first hash on the first set of statistics using a rolling hash function, compiling 206 a second set of statistics relating to a second structure of a second electronic document, computing 208 a second hash on the second set of statistics using the rolling hash function, and determining 210 an edit distance between the second hash and the first hash. In some cases, the first structure and the second structure each include at least one COS object tree structure of a Portable Document Format (PDF) document. In some cases, the first structure is representative of a document class, and the method 200 includes classifying 212 the second electronic document as a member of the document class based on the edit distance, where the edit distance is less than a threshold value.

Referring to FIG. 4, in another embodiment, the first and second structures are representative of a document class. The method 200 includes compiling 220 a third set of statistics relating to a third structure of a third electronic document, computing 222 a third hash on the third set of statistics using the rolling hash function, determining 224 an edit distance between the third hash and the first hash, and classifying 226 the third electronic document as a member of the document class based on the edit distance between the third hash and the first hash, where the edit distance between the third hash for the third (e.g., unclassified) document and the first hash for the first (e.g., representative) document is less than or equal to the edit distance between the second hash for the second (e.g., representative) document and the first hash.

Referring to FIG. 5, in another embodiment, the first and second structures are representative of a document class, and the method 200 includes compiling 230 a third set of statistics relating to a third structure of a third electronic document, where the third structure is representative of the same document class. The method 200 continues by computing 232 a third hash on the third set of statistics using the rolling hash function, computing 234 a variance to a mean of edit distances between each of the first and second hash, the first and third hash, and the second and third hash, compiling 236 a fourth set of statistics relating to a fourth structure of a fourth electronic document, computing 238 a fourth hash on the fourth set of statistics using the rolling hash function, determining 240 an edit distance between the fourth hash and the first hash, and classifying 242 the fourth electronic document as a member of the document class based on the edit distance between the fourth hash and the first hash, where the edit distance between the fourth hash and the first hash is less than or equal to the variance.

In some embodiments, the first hash forms at least a portion of a search query. In such cases, the method 200 includes matching the second electronic document with the first electronic document based on the edit distance, where the edit distance is less than a threshold value.

Example Computing Device

Figure 6:
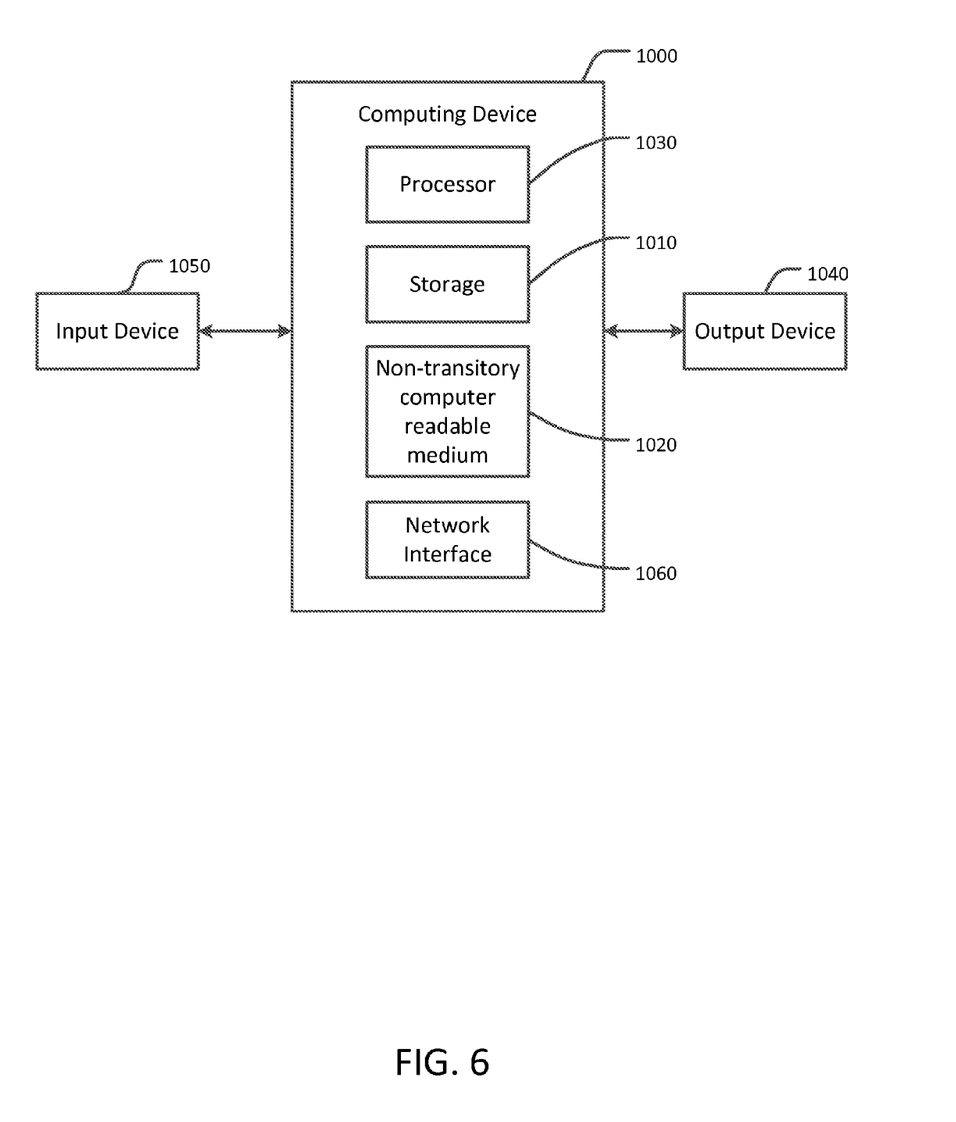
FIG. 6 is a block diagram representing an example computing device that may be used in accordance with an embodiment of the present invention.

FIG. 6 is a block diagram representing an example computing device 1000 that may be used to perform any of the techniques as variously described in this disclosure. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described in this disclosure. For instance, the computing device may include or be operatively coupled to a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, various embodiments, such as the method 200 of FIGS. 3, 4 and 5, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including compiling a first set of statistics relating to a first structure of a first electronic document; computing a first hash on the first set of statistics (e.g., using a rolling hash function); compiling a second set of statistics relating to a second structure of a second electronic document; computing a second hash on the second set of statistics (e.g., using the rolling hash function); and determining an edit distance between the second hash and the first hash. In some cases, the first structure is representative of a document class, and the process includes classifying the second electronic document as a member of the document class based on the edit distance, where the edit distance is less than a threshold value. In some cases, the first and second structures are representative of a document class, and the process includes compiling a third set of statistics relating to a third structure of a third electronic document; computing a third hash on the third set of statistics (e.g., using the rolling hash function); determining an edit distance between the third hash and the first hash; and classifying the third electronic document as a member of the document class based on the edit distance between the third hash and the first hash, where the edit distance between the third hash and the first hash is less than or equal to the edit distance between the second hash and the first hash. In some cases, the first and second structures are representative of a document class, and the process includes compiling a third set of statistics relating to a third structure of a third electronic document, the third structure being representative of the document class; computing a third hash on the third set of statistics (e.g., using the rolling hash function); computing a variance to a mean of edit distances between each of the first and second hash, the first and third hash, and the second and third hash; compiling a fourth set of statistics relating to a fourth structure of a fourth electronic document; computing a fourth hash on the fourth set of statistics (e.g., using the rolling hash function); determining an edit distance between the fourth hash and the first hash; and classifying the fourth electronic document as a member of the document class based on the edit distance between the fourth hash and the first hash, where the edit distance between the fourth hash and the first hash is less than or equal to the variance. In some cases, the first hash forms at least a portion of a search query, and the process includes matching the second electronic document with the first electronic document based on the edit distance, where the edit distance is less than a threshold value. In some cases, the first structure and the second structure each include at least one COS object tree structure of a Portable Document Format (PDF) document. In some cases, the first set of statistics includes a number of comments in the first structure of the first electronic document, a number of object references in the first structure, a number of trailers in the first structure, a number of indirect objects in the first structure, object identification values in the first structure, or any combination of these. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
    parsing, by a processor, a first structure of a first electronic document to obtain a first plurality of document objects forming the first structure, the first structure being representative of a document class, the first electronic document being classified as a member of the document class, the document class including a plurality of documents each having associated therewith a hash on a set of statistics relating to the respective document;
    compiling, by the processor, a first set of statistics relating to the first plurality of document objects forming the first structure of the first electronic document;
    computing, by the processor, a first hash on the first set of statistics using a rolling hash function;
    parsing, by the processor, a second structure of a second electronic document to obtain a second plurality of document objects forming the second structure;
    compiling, by the processor, a second set of statistics relating to the second plurality of document objects forming the second structure of the second electronic document;
    computing, by the processor, a second hash on the second set of statistics using the rolling hash function;
    determining, by the processor, an edit distance between the second hash and the first hash;
    computing, by the processor, a threshold value as a maximum of all edit distances for all documents in the document class from a mean of all hashes of all documents in the document class including the first hash;
    classifying, by the processor, the second electronic document as a member of the document class based on the edit distance between the first and second documents, wherein the edit distance between the first and second documents is less than the threshold value; and
    causing, by the processor, at least one of the first electronic document and the classified second electronic document to be presented to a user via a user interface in response to a search query including at least one of the first hash and the second hash.

2. The computer-implemented method of claim 1, wherein the first and second structures are representative of the document class, and wherein the method further comprises:
    parsing, by the processor, a third structure of a third electronic document to obtain a third plurality of document objects forming the third structure;
    compiling, by the processor, a third set of statistics relating to the third plurality of document objects forming the third structure of the third electronic document;
    computing, by the processor, a third hash on the third set of statistics using the rolling hash function;
    determining, by the processor, an edit distance between the third hash and the first hash; and
    classifying, by the processor, the third electronic document as a member of the document class based on the edit distance between the third hash and the first hash, wherein the edit distance between the third hash and the first hash is less than or equal to the edit distance between the second hash and the first hash.

3. The computer-implemented method of claim 1, wherein the first and second structures are representative of the document class, and wherein the method further comprises:
    parsing, by the processor, a third structure of a third electronic document to obtain a third plurality of document objects forming the third structure;
    compiling, by the processor, a third set of statistics relating to the third plurality of document objects forming the third structure of the third electronic document, the third structure being representative of the document class;
    computing, by the processor, a third hash on the third set of statistics using the rolling hash function;
    computing, by the processor, a variance to a mean of edit distances between each of the first and second hash, the first and third hash, and the second and third hash;
    compiling, by the processor, a fourth set of statistics relating to a fourth plurality of document objects forming a fourth structure of a fourth electronic document;
    computing, by the processor, a fourth hash on the fourth set of statistics using the rolling hash function;
    determining, by the processor, an edit distance between the fourth hash and the first hash; and
    classifying, by the processor, the fourth electronic document as a member of the document class based on the edit distance between the fourth hash and the first hash, wherein the edit distance between the fourth hash and the first hash is less than or equal to the variance.

4. The computer-implemented method of claim 1, wherein the first hash forms at least a portion of the search query, and wherein the method further comprises:
matching, by the processor, the second electronic document with the first electronic document based on the edit distance, wherein the edit distance is less than the threshold value.

5. The method of claim 1, wherein the first structure and the second structure each include at least one COS object tree structure of a Portable Document Format (PDF) document.

6. The method of claim 1, wherein the first set of statistics includes at least one of a number of comments in the first structure of the first electronic document, a number of object references in the first structure, a number of trailers in the first structure, a number of indirect objects in the first structure, and object identification values in the first structure.

7. The computer-implemented method of claim 1, further comprising recalculating the mean of all hashes of all documents in the document class to include the second hash subsequent to classifying the second electronic document as a member of the document class.

8. A system comprising:
a storage;
a processor operatively coupled to the storage, the processor configured to execute instructions stored in the storage that when executed cause the processor to carry out a process comprising:
parsing a first structure of a first electronic document to obtain a first plurality of document objects forming the first structure, the first structure being representative of a document class, the first electronic document being classified as a member of the document class, the document class including a plurality of documents each having associated therewith a hash on a set of statistics relating to the respective document;
compiling a first set of statistics relating to the first plurality of document objects forming the first structure of the first electronic document;
computing a first hash on the first set of statistics using a rolling hash function;
parsing a second structure of a second electronic document to obtain a second plurality of document objects forming the second structure;
compiling a second set of statistics relating to the second plurality of document objects forming the second structure of the second electronic document;
computing a second hash on the second set of statistics using the rolling hash function;
determining an edit distance between the second hash and the first hash;
computing a threshold value as a maximum of all edit distances for all documents in the document class from a mean of all hashes of all documents in the document class including the first hash;
classifying the second electronic document as a member of the document class based on the edit distance between the first and second documents, wherein the edit distance between the first and second documents is less than the threshold value; and
causing at least one of the first electronic document and the classified second electronic document to be presented to a user via a user interface in response to a search query including at least one of the first hash and the second hash.

9. The system of claim 8, wherein the first and second structures are representative of the document class, and wherein the process further comprises:
parsing a third structure of a third electronic document to obtain a third plurality of document objects forming the third structure;
compiling a third set of statistics relating to the third plurality of document objects forming the third structure of the third electronic document;
computing a third hash on the third set of statistics using the rolling hash function;
determining an edit distance between the third hash and the first hash; and
classifying the third electronic document as a member of the document class based on the edit distance between the third hash and the first hash, wherein the edit distance between the third hash and the first hash is less than or equal to the edit distance between the second hash and the first hash.

10. The system of claim 8, wherein the first and second structures are representative of the document class, and wherein the process further comprises:
parsing a third structure of a third electronic document to obtain a third plurality of document objects forming the third structure;
compiling a third set of statistics relating to the third plurality of document objects forming the third structure of the third electronic document, the third structure being representative of the document class;
computing a third hash on the third set of statistics using the rolling hash function;
computing a variance to a mean of edit distances between each of the first and second hash, the first and third hash, and the second and third hash;
compiling a fourth set of statistics relating to a fourth plurality of document objects forming a fourth structure of a fourth electronic document;
computing a fourth hash on the fourth set of statistics using the rolling hash function;
determining an edit distance between the fourth hash and the first hash; and
classifying the fourth electronic document as a member of the document class based on the edit distance between the fourth hash and the first hash, wherein the edit distance between the fourth hash and the first hash is less than or equal to the variance.

11. The system of claim 8, wherein the first hash forms at least a portion of the search query, and wherein the process further comprises:
matching the second electronic document with the first electronic document based on the edit distance, wherein the edit distance is less than the threshold value.

12. The system of claim 8, wherein the first structure and the second structure each include at least one COS object tree structure of a Portable Document Format (PDF) document.

13. The system of claim 8, wherein the first set of statistics includes at least one of a number of comments in the first structure of the first electronic document, a number of object references in the first structure, a number of trailers in the first structure, a number of indirect objects in the first structure, and object identification values in the first structure.

14. The system of claim 8, wherein the process further comprises recalculating the mean of all hashes of all documents in the document class to include the second hash subsequent to classifying the second electronic document as a member of the document class.

15. A non-transitory computer program product having instructions encoded thereon that when executed by one or more processors cause a process to be carried out, the process comprising:

parsing a first structure of a first electronic document to obtain a first plurality of document objects forming the first structure, the first structure being representative of a document class, the first electronic document being classified as a member of the document class, the document class including a plurality of documents each having associated therewith a hash on a set of statistics relating to the respective document;

compiling a first set of statistics relating to the first plurality of document objects forming the first structure of the first electronic document;

computing a first hash on the first set of statistics using a rolling hash function;

parsing a second structure of a second electronic document to obtain a second plurality of document objects forming the second structure;

compiling a second set of statistics relating to the second plurality of document objects forming the second structure of the second electronic document;

computing a second hash on the second set of statistics using the rolling hash function;

determining an edit distance between the second hash and the first hash;

computing a threshold value as a maximum of all edit distances for all documents in the document class from a mean of all hashes of all documents in the document class including the first hash;

classifying the second electronic document as a member of the document class based on the edit distance between the first and second documents, wherein the edit distance between the first and second documents is less than the threshold value; and causing at least one of the first electronic document and the classified second electronic document to be presented to a user via a user interface in response to a search query including at least one of the first hash and the second hash.

16. The non-transitory computer program product of claim 15, wherein the first and second structures are representative of the document class, and wherein the process further comprises:

parsing a third structure of a third electronic document to obtain a third plurality of document objects forming the third structure;

compiling a third set of statistics relating to the third plurality of document objects forming the third structure of the third electronic document;

computing a third hash on the third set of statistics using the rolling hash function;

determining an edit distance between the third hash and the first hash; and classifying the third electronic document as a member of the document class based on the edit distance between the third hash and the first hash, wherein the edit distance between the third hash and the first hash is less than or equal to the edit distance between the second hash and the first hash.

17. The non-transitory computer program product of claim 15, wherein the first and second structures are representative of the document class, and wherein the process further comprises:

parsing a third structure of a third electronic document to obtain a third plurality of document objects forming the third structure;

compiling a third set of statistics relating to the third plurality of document objects forming the third structure of the third electronic document, the third structure being representative of the document class;

computing a third hash on the third set of statistics using the rolling hash function;

computing a variance to a mean of edit distances between each of the first and second hash, the first and third hash, and the second and third hash;

compiling a fourth set of statistics relating to a fourth plurality of document objects forming a fourth structure of a fourth electronic document;

computing a fourth hash on the fourth set of statistics using the rolling hash function;

determining an edit distance between the fourth hash and the first hash; and classifying the fourth electronic document as a member of the document class based on the edit distance between the fourth hash and the first hash, wherein the edit distance between the fourth hash and the first hash is less than or equal to the variance.

18. The non-transitory computer program product of claim 15, wherein the first hash forms at least a portion of the search query, and wherein the process further comprises:

matching the second electronic document with the first electronic document based on the edit distance, wherein the edit distance is less than the threshold value.

19. The computer program product of claim 15, wherein the first structure and the second structure each include at least one COS object tree structure of a Portable Document Format (PDF) document.

20. The non-transitory computer program product of claim 15, wherein the process further comprises recalculating the mean of all hashes of all documents in the document class to include the second hash subsequent to classifying the second electronic document as a member of the document class.

* * * * *